(12) United States Patent
Pinter et al.

(10) Patent No.: US 6,460,039 B1
(45) Date of Patent: Oct. 1, 2002

(54) MIDDLEWARE SUPPORT FOR PRIMARY COMPONENT IN A PARTITIONABLE CLUSTER ENVIRONMENT

(75) Inventors: Shlomit Pinter, Haifa; Esther Yeger-Lotem, Mitzpe Aviv, both of (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/456,682

(22) Filed: Dec. 9, 1999

(51) Int. Cl.$^7$ ................................................ G06F 17/30
(52) U.S. Cl. ........................ 707/10; 707/8; 707/103 R; 709/227
(58) Field of Search .............................. 707/10, 103 R, 707/104.1, 8; 7809/227; 370/466

(56) References Cited

U.S. PATENT DOCUMENTS 6,047,323 A * 4/2000 Krause ........................ 709/227
6,317,438 B1 * 11/2001 Trebes, Jr. ................... 370/466

OTHER PUBLICATIONS

M. Hayden; "Ensemble Reference Manual", Cornell University, 1997.
G. Goft and E. Yeger Lotem, "The AS/400 Cluster Engine: A Case Study"; The International Group Communications Conference IGCC 99; Aizu, Japan, 1999.
R. Friedman and A. Vaysburd; "High Performance Replicated Distributed Objects in Partitionable Environment", Technical Report 97–1639, Computer Science, Cornell University; Jul. 1997.
E. Yeger Lotem et al., "Dynamic Voting for Consistent Primary Components"; ACM Symposium on Principles of Distributed Computing PODC 97; Santa Barbara, CA, USA; 1974.

* cited by examiner

*Primary Examiner*—Diane D. Mizrahi
(74) *Attorney, Agent, or Firm*—Darby & Darby

(57) ABSTRACT

A method for controlling operation of a computer software application running on a given computing entity, which is a member of a group of mutually-linked computing entities running the application within a distributed computing system. The method includes selecting a partitioning strategy for the application from among a plurality of available strategies. When a message is received at the given computing entity indicative of a change in membership of the group, the given computing entity determines in accordance with the selected partitioning strategy whether the given computing entity belongs to a primary component of the group following the change in membership, such that running of the software application on the given entity is restricted if the entity does not belong to the primary component.

22 Claims, 4 Drawing Sheets

MIDDLEWARE SUPPORT FOR PRIMARY COMPONENT IN A PARTITIONABLE CLUSTER ENVIRONMENT

FIELD OF THE INVENTION

The present invention relates generally to distributed computing systems, and specifically to partitioning of clusters used in distributed computing applications.

BACKGROUND OF THE INVENTION

Computer clusters are widely used to enable high availablity of computing resources, coupled with the possibility of horizontal growth, at reduced cost by comparison with collections of independent systems. Clustering is also useful in disaster recovery. A wide range of clustering solutions are currently available, including 390 Sysplex, RS/6000 SP, HACMP, PC Netfinity and AS/400 Cluster, all offered by IBM Corporation, as well as Tandem Himalaya, Hewlett-Packard Mission Critical Server, Compaq TruCluster, Microsoft MSCS, NCR LifeKeeper and Sun Microsystems Project Cascade. An AS/400 Cluster, for example, supports up to 128 computing nodes, connected via any Internet Protocol (IP) network. A developer of a software application can define and use group of physical or logical computing entities (such as files, devices or processes) to run the application with in the cluster environment.

Cluster applications must generally maintain consistency among all of the entities participating in the application. When a failure occurs in a cluster environment, however, the failure may result in the cluster being divided into two or more disconnected partitions. If all of these disconnected partitions continue running the application, inconsistencies may arise, for example, inconsistencies in a database that is replicated and updated by different cluster entities. These inconsistencies may be impossible to resolve when the partitions are again merged after recovery from the failure. For this reason, cluster applications typically allow only one partition to run. The partition that is selected to run is known as the primary partition or primary component. All other partitions are blocked from, proceeding with the application. Following recovery from the failure, the entities in these other partitions are merged back with the primary partition and are again available to the application.

Distributed group communication systems (GCSs) enable applications to exchange messages within groups of cluster entities in a reliable, ordered manner. For example, the OS/400 operating system kernel for the above-mentioned AS/400 Cluster includes a GCS in the form of middleware for use by cluster applications. This GCS is described in an article by Goft et al., entitled "The AS/400 Cluster Engine: A Case Study," presented at the International Group Communications Conference IGCC 99 (Aizu, Japan, 1999), which is incorporated herein by refertnce. The GCS ensures that if a message addressed to the entire group is delivered to one of the group members, the message will be also delivered to all other live and connected members of the group, so that group members can act upon received messages and remain consistent with one another. The GCS also informs the application of the identities of the current connected set of members in the group.

"Ensemble" is a GCS that was developed at Cornell University, as were its predecessors, "ISIS" and "Horus." Ensemble is described in the "Ensemble Reference Manual," by Hayden (Cornell University, 1997), and in an article entitled "High Performance Replicated Distributed Objects in a Partitionable Environment," by Friedman et al. (Technical Report 97–1639, Computer Science, Cornell University, 1997), both of which are incorporated herein by reference. Ensemble supports multiple concurrent partitions, of which no more than one can be primary. All group members know if they are in the primary partition and are allowed to take actions that can change their state only if they are in the primary partition. The primary partition (or primary view) must include a majority of a predefined set of group members. An Ensemble protocol known as "PRIMARY" is used to detect the primary partition based on this criterion.

SUMMARY OF THE INVENTION

It is an object of some aspects of the present invention to provide improved methods and systems for enabling computer applications running on a cluster of participating entities to deal with partitioning of the cluster.

It is a further object of some aspects of the present invention to provide tools for use in an application program to handle partitioning of a cluster on which the application is running and to distribute information regarding partition status.

In preferred embodiments of the present invention, a group communication system (GCS) for use in a group of computing entities provides partitioning support to software applications running in the group. The partitioning support offers a choice of partitioning strategies by means of which the entities in the group, typically comprising processes running on a cluster of computing nodes linked by a network, determine whether or not they are in the primary component when the cluster is partitioned. Preferably, the GCS includes an application program interface (API), which is used by a developer of a software application to select the desired strategy. When a change in group membership occurs while the application is running, each group member determines whether or not the group member is in the primary component using a protocol of the GCS based on the selected strategy.

The present invention thus facilitates definition of how the entities in the group are to behave in response to partitioning and membership changes, and relieves application developers of the need to program such behavior in detail at the application level. In the absence of the type of tools provided by the present invention, which are not offered by clustering solutions known in the art, it is difficult to program an application-level partitioning solution, and in most cases the application must simply stop running when a partition occurs. Whereas the Ensemble GCS, described in the Background of the Invention, can provide limited partitioning support, Ensemble allows no choice of strategies and rigidly designates the majority component as the primary one. By contrast, the API and middleware partitioning support provided by preferred. embodiments of the present invention enable the developer simply to select the strategy that is most appropriate to the needs. of the particular application. Preferably, the API offers a range of selections, which can be expanded by the application developer if desired.

Although preferred embodiments described herein are based on a GCS, it will be appreciated that the principles of the present invention may similarly be implemented in substantially any distributed computing environment in which there is a mechanism for partitioning and keeping track of membership of entities in a computing group or cluster. As noted above, such entities may comprise either physical or logical entities. Furthermore, different partitioning strategies can be selected for different applications, even when the different applications are running concurrently on the same cluster of nodes.

There is therefore provided, in accordance with a preferred embodiment of the present invention, a method for controlling operation of a computer software application running on a given computing entity, which is a member of a group of mutually-linked computing entities running the application within a distributed computing system, the method including:

selecting a partitioning strategy for the application from among a plurality of available strategies;

receiving a message at the given computing entity indicative of a change in membership of the group; and determining in accordance with the selected partitioning strategy whether the given computing entity belongs to a primary component of the group following the change in membership, such that running of the software application on the given entity is restricted if the entity does not belong to the primary component.

Preferably, selecting the partitioning strategy includes selecting a strategy for the application using an application program interface, wherein selecting the strategy most preferably includes selecting one of a plurality of predefined strategies.

In a preferred embodiment, selecting the partitioning strategy includes designating one of the, computing entities as a monarch entity, such that the. given computing entity belongs to the primary component if the given computing entity belongs to the same. component of the group as the monarch entity.

In another preferred embodiment, selecting the partitioning strategy includes selecting a dynamic voting strategy such that following the change in membership, the given computing entity is determined to belong to the primary component if the given computing entity belongs to a component of the group containing more than half of the entities of a previous primary component of the group. defined before the change in membership.

In still another preferred embodiment, selecting the partitioning strategy includes selecting a strategy such that the application continues to run on all of the computing entities substantially without restriction notwithstanding any change in membership.

Preferably, receiving the message includes receiving an indication of a partitioning of the group of entities into two or more components due to a failure in the system. In a preferred embodiment, selecting the partitioning strategy includes selecting a strategy such that there will be no primary component following the partitioning of the group, whereby running of the application is restricted on all of the computing entities following the partition.

Preferably, the computing entities include computer nodes, mutually-linked by a network, and receiving the indication includes receiving an indication of a failure in communications over the network. Further preferably, selecting the partitioning strategy includes initializing group communication system middleware responsive to the selected partitioning strategy, wherein receiving the message includes receiving a membership message from the middleware.

There is also provided, in accordance with a preferred embodiment of the present invention, distributed computing apparatus, including:

a computer network; and a group of computer nodes, mutually-linked by the network so as to run a computer software application in, accordance with a partitioning strategy selected for the application from among a plurality of available strategies, such that when a given one of the nodes receives a message indicative of a change in membership of the group, the given node determines in accordance with the selected partitioning strategy whether the given node belongs to a primary component of the group following the change in membership, wherein running of the software application on the given node is restricted if the node does not belong to the primary component.

There is additionally provided, in accordance with a preferred embodiment of the present invention, a computer software product for controlling operation of an application running on a given computing entity, which is a member of a group of mutually-linked computing entities running the application within a distributed computing system, the product including a computer-readable medium in which computer program instructions are stored, which instructions, when read by the given computing entity, cause the entity to select a partitioning strategy for the application from among a plurality of available strategies, such that when a message is received at the given computing entity indicative of a change in membership of the group, the computing entity determines in accordance with the selected partitioning strategy whether the given computing entity belongs to a primary component of the group following the change in membership, such that running of the software application on the given entity is restricted if the entity does not belong to the primary component.

Preferably, the product is a middleware package, which includes a group communication system. Most preferably, the product includes an application program interface, with which the computer software application communicates.

The present invention will be more fully understood from the following detailed description of the preferred embodiments thereof, taken together with the drawings in which:

DETAILED DESCRIPTION OF PREFERRED EMBODIMENTS

Figure 1:
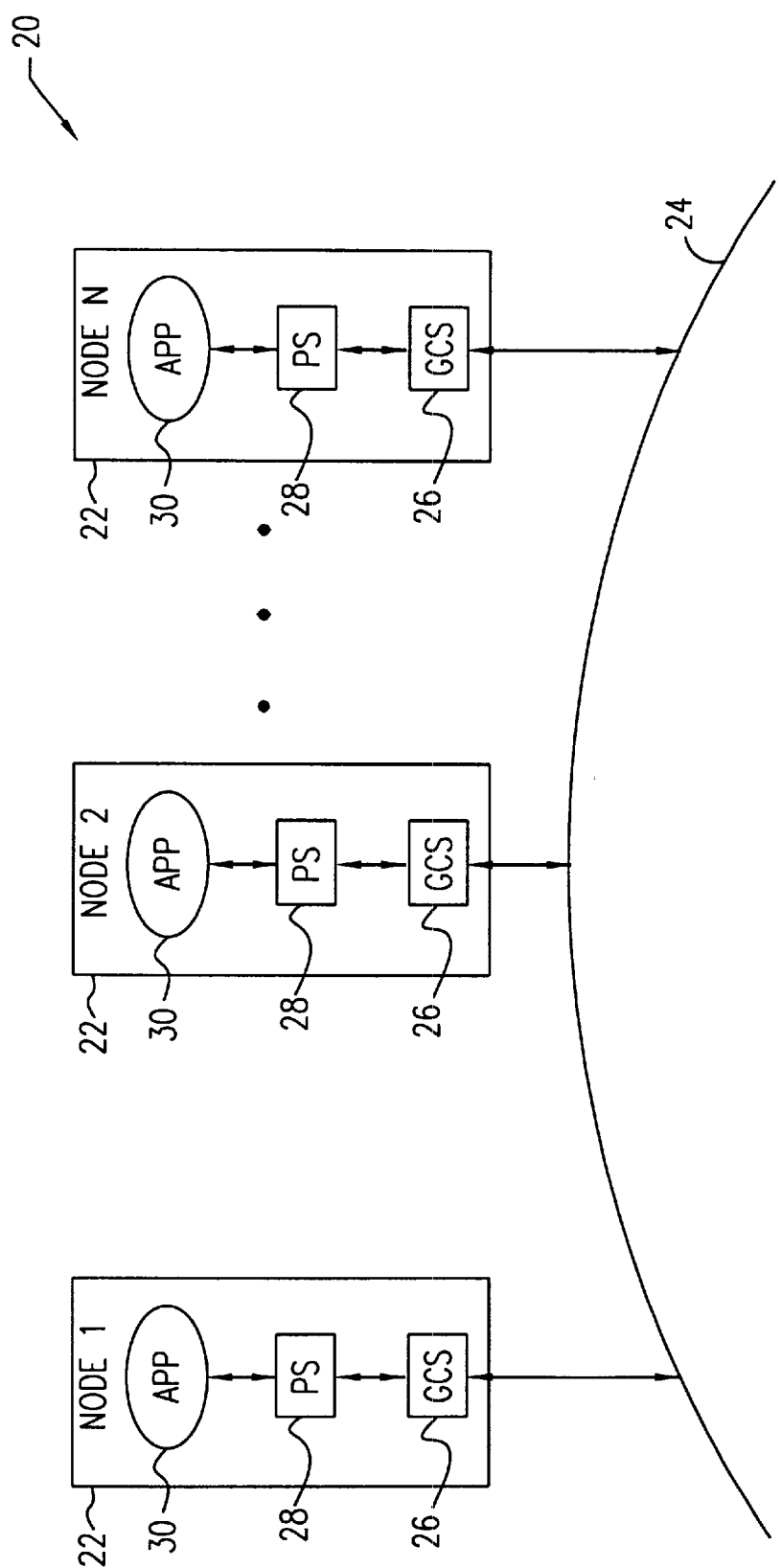
FIG. 1 is a block diagram that schematically illustrates a group of computing nodes linked by a network, in accordance with a preferred embodiment of the present invention.

FIG. 1 is a block diagram that schematically illustrates a distributed computing group 20, or cluster, comprising a plurality of members, or nodes 22, mutually linked by a network 24, in accordance with a preferred embodiment of the present invention. Nodes 22, which are labeled "NODE 1," "NODE 2,"..., "NODE N" for convenience, preferably comprise IBM AS/400 computers, running the OS/400 (operating system, which includes a GCS middleware layer 26. Network 24 preferably comprises a local area network (LAN) or switch fabric, which most preferably operates in accordance with the Internet Protocol (IP) Alternatively, any other suitable types of nodes, network, operating system and GCS that are known in the art of distributed computing may be used.

A software application 30 runs on nodes 22, wherein operations of the application are distributed among a set of the nodes of group 20, with a respective instance of the application on each of the nodes. GCS 26 provides facilities that support such distributed operation, as is known in the art, including guaranteed distribution of messages among nodes 22 and reporting on any membership changes in the group of nodes running the application.

Preferably, the GCS also ensures that the messages are delivered to all of the nodes in the same order. A partitioning support (PS) layer 28 is used to keep track of partitioning of group 20 and to control the behavior of application 30 in response to such partitioning, in accordance with a selected partitioning strategy, as described in detail hereinbelow. Software such as application 30, GCS 26 and PS 28 is typically distributed to movies 22 over network 24. Alternatively, the software may be supplied on tangible media, such as CD-ROM, for installation on the nodes.

Figure 2:
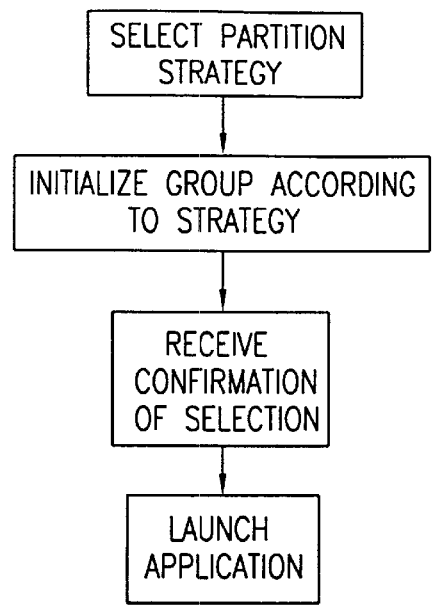
FIG. 2 is a flow chart that schematically illustrates a method for selecting a partitioning strategy for use by an application running on a group of nodes, in accordance with a preferred embodiment of the present invention.

FIG. 2 is a flow chart that schematically illustrates a method for choosing the partitioning strategy to implement in group 20, in accordance with a preferred embodiment of the present invention. Preferably, an application program interface (API) is associated with PS 28 and is used by a developer of application 30 to select an appropriate partitioning strategy for the application from among a range of choices. The strategy indicates how, following a partition of group 20, nodes 22 are to determine whether they are in a primary component of the group or not. Possible strategies include:

Majority voting, wherein the partition of the group containing more than half of a predefined set of group members, F, is designated the primary component.

Weighted majority, wherein different nodes are given different, respective weights, such that the partition having a cumulative weight greater than half of a predefined total weight is designated the primary component.

"Monarchy," wherein the primary component must contain one designated member. This might be the node that maintains the master copy of a database used by the application, for example.

Dynamic voting, wherein however many members are included in the primary component before a partition, the primary component after the partition is the one containing more than half of these members. The membership in the primary component for the purpose of dynamic voting will initially comprise a set P, but this set will be updated any time the primary component is partitioned. Weighted dynamic voting, similar to the weighted majority strategy, may similarly be used.

Unanimity, wherein all of the members of a predefined set must be in the group in order for the application to run.

No primary component, in which case the application continues running after the partition, with no need for a primary component.

It will be understood that these alternative strategies are listed by way of example, and not limitation, and substantially any feasible strategy can be offered by the API and supported by PS 28. Optionally, the API includes appropriate tools, such as a scripting language, which the application developer can use to define other strategies appropriate to the application (for example, a "triumvirate" strategy, in which three designated members must be present in the primary component). In any case, the API relieves the application developer of the need to write application-level programming to control the behavior of the application when GCS 26 gives notification that a partition has occurred or, in the alternative, to halt the application until the partition is resolved.

Application 30 uses a command provided by the API to input to PS 28 the selected partitioning strategy and parameters associated with the strategy that are needed to run the application. Typically, the command has the form:

strategy_type selectStrategy(group_name G, strategy_type S, initial_quorum Q)

The terms in this expression have the following meanings:

G specifies the group for which the strategy is selected, wherein the group is defined and created for the particular application 30. In case of conflicting strategies within a single group, when different instances of the same application select different strategies, for example, a priority mechanism is preferably used to resolve the conflict. Preferably, the priority is based on ordering of successive strategy selections, but other priority mechanisms, such as precedence of the earliest-selected strategy, may also be used.

S specifies the selected strategy, such as majority, monarchy, dynamic_voting, unanimity or none, as described above.

Q specifies the set of group members based on which the Primary component is to be designated, such as g, F or P (in which case P is the initial set only), as defined above.

Based on the command input from the application, PS 28 initializes the group to run the application, by sending an initialization primitive to GCS 26. The PS responds to the command by returning to the application a confirmation of the selected strategy. The application is then launched.

Figure 3:
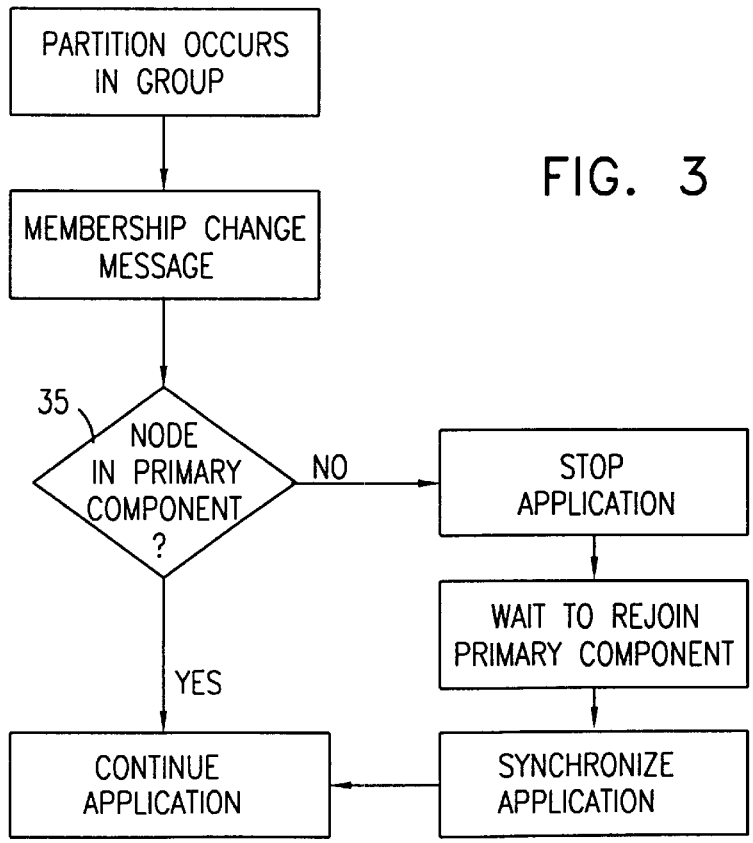
FIG. 3 is a flow chart that schematically illustrates a method for responding to a partition of a group of nodes, in accordance with a preferred embodiment of the present invention.

FIG. 3 is a flow chart that schematically illustrates a method and protocol for dealing with partitions of group 20 during the running of application 30, in accordance with a preferred embodiment of the present invention. When a partition occurs, due to a network fault, for example, GCS 26 passes a membership change message to PS 28. The message has the general form (H,i), wherein H is the subset of the group G to which a given node p (p=1, 2, ..., N) is currently connected, and i is a membership message identifier. (Before any partition has occurred, H =G.) In response to this message, at a step 35, PS 28 determines whether or not node p is in the primary component, depending on the selected strategy. Methods for determining the "primariness" of p are described in greater detail hereinbelow.

PS 28 notifies application 30 running on each node p of the membership change and the determination as to whether or not node p is in the primary component for application 30. To the extent that the node is in the primary component, the application can continue running on the node. If node p is not in the primary component, execution of the application on the node is restricted, wherein most commonly the application simply stops running on node p and waits for another membership change message to indicate that node p can rejoin the primary component. At that point a status update is received from one of the members that was in the primary component. Based on this update, the application data on the node is synchronized with the other nodes in the primary component, and the application continues to run.

Optionally, the selected partitioning strategy also specifies how the group member is to behave when the group member determines that the group member does not belong to the primary component. For example, the strategy may specify that any non-primary components are destroyed after a partition, i.e., that the non-primary components cannot rejoin the group carrying out application 30 even after a failure that caused the partitioning is resolved.

Figure 4:
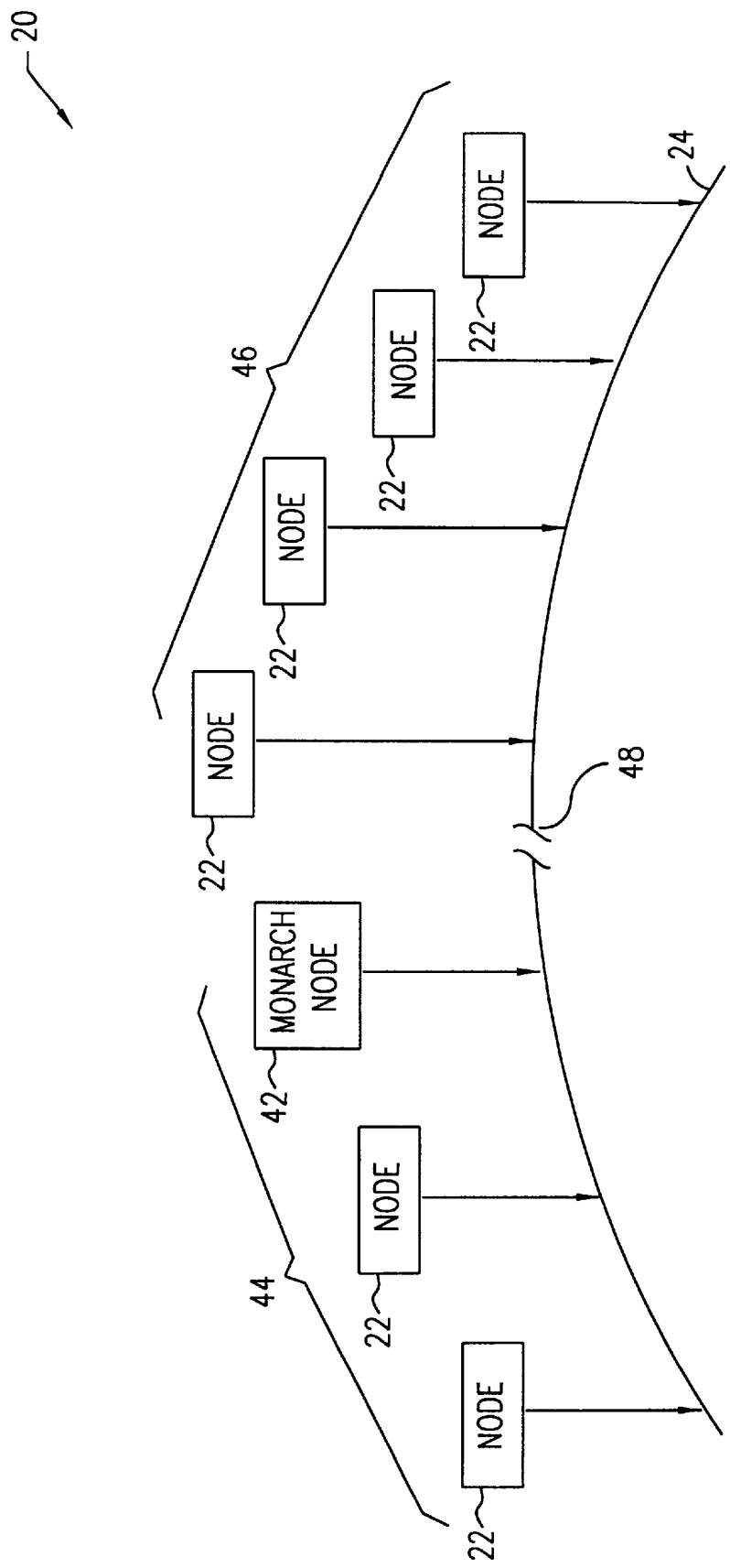
FIG. 4 is a block diagram that schematically illustrates partitioning and selection of a primary partition component in a group of computing nodes, in accordance with a preferred embodiment of the present invention.

FIG. 4 is a block diagram that schematically illustrates a partitioning of group 20 based on the monarchy strategy described hereinabove, in accordance with a preferred embodiment of the present invention. As specified by the strategy, a node 42 is designated the monarch node when GCS 26 is initialized for application 30. A fault 48 in network 24 causes group 20 to be partitioned into two components 44 and 46, and the GCS conveys membership change message accordingly to PS 28. Although component 46 is the majority component, monarch node 42 is in component 44, which is therefore designated by PS 28 as the primary component following the partition. If fault 48 is resolved, nodes 22 in component 46 can rejoin the group carrying out the application.

Figure 5:
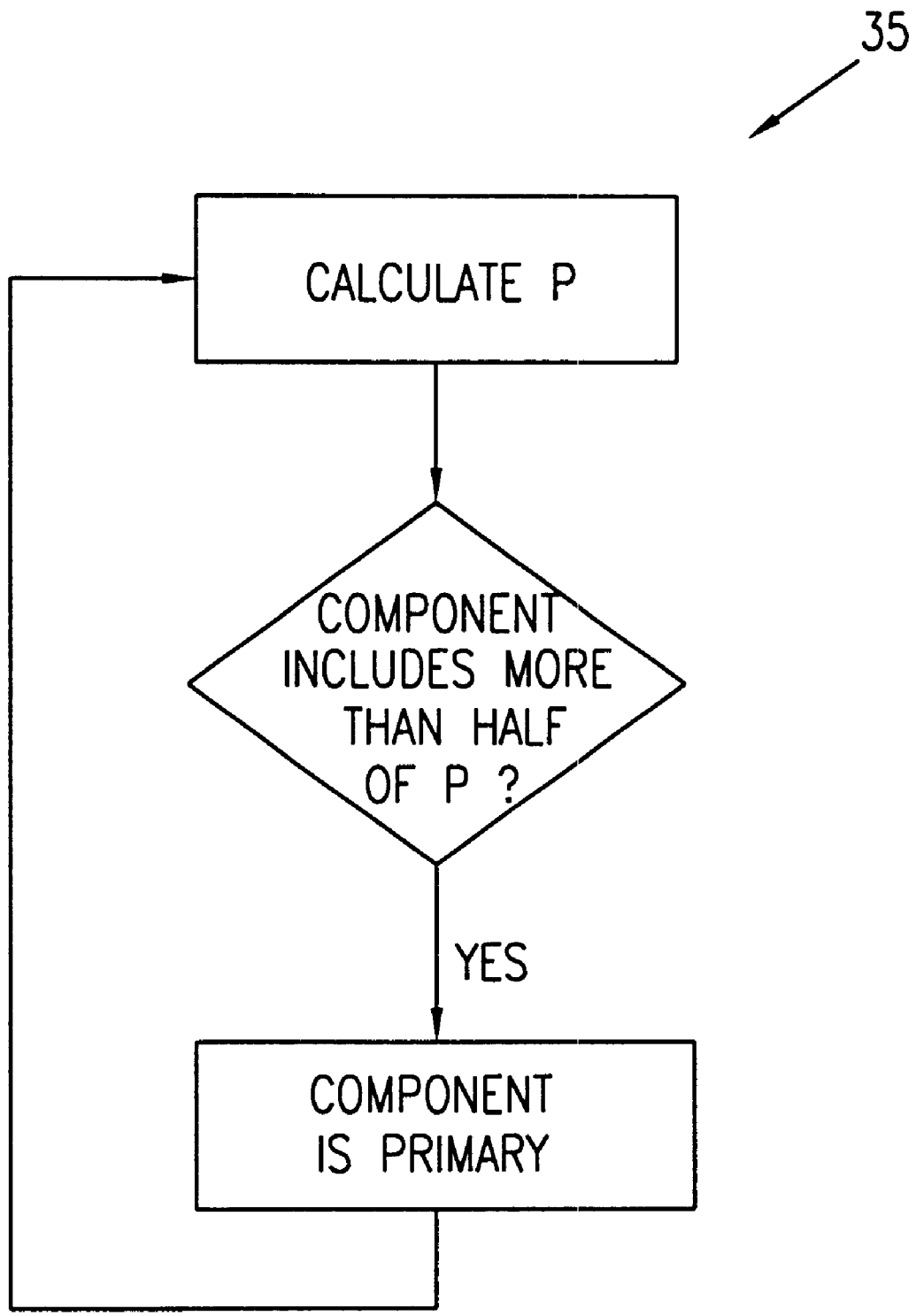
FIG. 5 is a flow chart that schematically illustrates a protocol by means of which members of a group of nodes determine whether they are in a primary partition component, in accordance with another preferred embodiment of the present invention.

FIG. 5 is a flow chart that schematically illustrates a protocol for determining whether a given node is in the primary component following a partition, using we dynamic voting strategy mentioned above, in accordance with a preferred embodiment of the present invention. The protocol of FIG. 5 corresponds to step 35 on FIG. 3 for this particular strategy. While application 30 is running, PS 28 calculates the value of P, which is the number of members currently in the primary component (which may include all of the members of group 20). When a membership change message is received, PS 28 determines whether the number of members remaining in the component that includes the given node is greater than half of P. If so, the node is considered to be in the primary component. PS 28 then calculates a new value of P, based on the membership of the current primary component, for use the next time a partition occurs. Dynamic voting protocols are described in detail in a paper by Yeger-Lotem et al., entitled "Dynamic Voting for Consistent Primary Components," presented at the ACM Symposium on Principles of Distributed Computing PODC 97 (Santa Barbara, Calif., 1997), which is incorporated herein by reference.

Although preferred embodiments described herein are based on GCS 26, it will be understood that PS 28 and the associated API may similarly be implemented, mutatis mutandis, in substantially any distributed computing environment in which there is a mechanism for membership tracking and partitioning of groups of computing entities. It will thus be appreciated that the preferred embodiments described above are cited by way of example, and the full scope of the invention is limited only by the claims.

What is claimed is:

1. A method for controlling operation of a computer software application running on a given computing node, which is a member of a group of mutually-linked computing nodes running the application within a distributed computing system, the method comprising:

selecting a partitioning strategy for the application from among a plurality of available strategies indicating a manner in which, following a partition of the group, each node among the nodes in the group is to make a determination as to whether the node making the determination is in a primary component of the group or not;

receiving a message at the given computing node indicative of a change in membership of the group; and determining in accordance with the selected partitioning strategy whether the given computing node belongs to the primary component of the group following the change in membership, such that running of the software application on the given node is restricted if the given node does not belong to the primary component.

2. A method according to claim 1, wherein selecting the partitioning strategy comprises selecting a strategy for the application using an application program interface.

3. A method according to claim 2, wherein selecting the strategy comprises selecting one of a plurality of predefined strategies.

4. A method according to claim 1, wherein selecting the partitioning strategy comprises designating one of the computing nodes as a monarch node, such that the given computing node belongs to the primary component if the given computing node belongs to the same component of the group as the monarch node.

5. A method according to claim 1, wherein selecting the partitioning strategy comprises selecting a dynamic voting strategy such that following the change in membership, the given computing node is determined to belong to the primary component if the given computing node belongs to a component of the group containing more than half of the nodes of a previous primary component of the group defined before the change in membership.

6. A method according to claim 1, wherein selecting the partitioning strategy comprises selecting a strategy such that the application continues to run on all of the computing nodes substantially without, restriction notwithstanding any change in membership.

7. A method according to claim 1, wherein receiving the message comprises receiving an indication of a partitioning of the group of nodes into two or more components due to a failure in the system.

8. A method according to claim 7, wherein selecting the partitioning strategy comprises selecting a strategy such that there will be no primary component following the partitioning of the group, whereby running of the application is restricted on all of the computing nodes following the partition.

9. A method according to claim 7, wherein the computing nodes are mutually-linked by a network, and wherein receiving the indication comprises receiving an indication of a failure in communications over the network.

10. A method according to claim 1, wherein selecting the partitioning strategy comprises initializing group communication system middleware responsive to the selected partitioning strategy.

11. A method according to claim 10, wherein receiving the message comprises receiving a membership message from the middleware.

12. Distributed computing apparatus, comprising:

a computer network; and a group of computer nodes, mutually-linked by the network so as to run a computer software application in accordance with a partitioning strategy selected for the application from among a plurality of available strategies indicating a. manner in which, following a partition of the group, each node among the nodes in the group is to make a determination as to whether the node making the determination is in a primary component of the group or not, such that when a given node among the nodes in the group receives a message indicative of a change in membership of the group, the given node determines in accordance with the selected partitioning strategy whether the given node belongs to the primary component of the group following the change in membership, wherein running of the software application on the given node is restricted if the given node does not belong to the primary component.

13. Apparatus according to claim 12, wherein the partitioning strategy is selected for the application using an application program interface.

14. Apparatus according to claim 13, wherein the application program interface offers a plurality of predefined strategies.

15. Apparatus according to claim 12, wherein the message is indicative of a partitioning of the group of entities responsive to a failure in communications over the network.

16. Apparatus according to claim 12, wherein the nodes initialize group communication system middleware responsive to the selected partitioning strategy.

17. Apparatus according to claim 16, wherein the middleware delivers the message indicative of the change in membership.

18. A computer software product for controlling operation of an application running on a given computing node, which is a member of a group of mutually-linked computing nodes running the application within a distributed computing system, the product comprising a computer-readable medium in which computer, program instructions are stored, which instructions, when. read by the given computing node, cause the given computing node to select a partitioning strategy for the application from among a plurality of available strategies indicating a manner in which, following a partition of the group, each node among the nodes in the group is to make a determination as to whether the node making the determination is in a primary component of the group or not, such that when a message is received at the given computing node indicative of a change in membership of the group, the given computing node determines in accordance with the selected partitioning strategy whether the given computing node belongs to the primary component of the group following the change in membership, such that running of the software application on the given entity is restricted if the given computing node does not belong to the primary component.

19. A product according to claim 18, wherein the product comprises a middleware package.

20. A product according to claim 19, wherein the middleware package comprises a group communication system.

21. A product according to claim 18, wherein the product comprises an application program interface, with which the computer software application communicates.

22. A method for controlling operation of a computer software application running on a given computing process, which is a member of a group of mutually-linked computing processes running the application within a distributed computing system, the, method comprising:

selecting a partitioning strategy for the application from among a plurality of available strategies indicating a manner in which, following a partition of the group, each process among the processes in the group is to make a determination as to whether thee process making the determination is in a primary component of the group or not;

receiving a message at the given computing process indicative of a change in membership of the group; and determining in accordance with the selected partitioning strategy whether the given computing processor belongs to the primary component of the group following the change in membership, such that running of the software application on the given process is restricted if the given process does not belong to the primary component.

\* \* \* \* \*